United States Patent
Joshi

(10) Patent No.: US 9,875,322 B2
(45) Date of Patent: Jan. 23, 2018

(54) SAVING AND RETRIEVING LOCATIONS OF OBJECTS

(71) Applicant: Google Inc., Mountain View, CA (US)

(72) Inventor: Ajay Joshi, Mountain View, CA (US)

(73) Assignee: Google LLC, Mountain View, CA (US)

( * ) Notice: Subject to any disclaimer, the term of this patent is extended or adjusted under 35 U.S.C. 154(b) by 416 days.

(21) Appl. No.: 14/620,246

(22) Filed: Feb. 12, 2015

(65) Prior Publication Data

US 2016/0034600 A1    Feb. 4, 2016

Related U.S. Application Data

(60) Provisional application No. 62/031,186, filed on Jul. 31, 2014.

(51) Int. Cl.
*G06F 17/30* (2006.01)

(52) U.S. Cl.
CPC .. *G06F 17/30979* (2013.01); *G06F 17/30654* (2013.01)

(58) Field of Classification Search
CPC ......... G06F 17/30554; G06F 17/30424; G06F 17/30241; G06F 17/2705; G06F 17/30976; G06F 17/30979; G06F 17/30654; G06F 17/30991; G06F 17/30964
USPC ....................................................... 707/769
See application file for complete search history.

(56) References Cited

U.S. PATENT DOCUMENTS

| | | | |
|---|---|---|---|
| 8,255,225 B2 | 8/2012 | Byford | |
| 8,706,503 B2 | 4/2014 | Cheyer | |
| 9,317,614 B2 * | 4/2016 | Stewart | G06F 17/30867 |
| 2005/0162523 A1 * | 7/2005 | Darrell | G06F 17/30864 |
| | | | 348/211.2 |
| 2012/0136667 A1 | 5/2012 | Emerick | |
| 2014/0149372 A1 * | 5/2014 | Sankar | G06F 17/30864 |
| | | | 707/706 |
| 2014/0330818 A1 * | 11/2014 | Raina | G06Q 30/02 |
| | | | 707/723 |
| 2014/0330819 A1 * | 11/2014 | Raina | G06F 17/3053 |
| | | | 707/723 |

(Continued)

OTHER PUBLICATIONS

International Preliminary Report on Patentability in International Application No. PCT/US2015/036165, dated Jan. 31, 2017, 9 pages.

(Continued)

*Primary Examiner* — Thanh-Ha Dang
(74) *Attorney, Agent, or Firm* — Fish & Richardson P.C.

(57) ABSTRACT

Among other things, this document describes a computer-implemented method for storing and retrieving information about the locations of objects. The method can include receiving a first query that includes one or more terms identifying an object. The first query can be determined to include a command to store location information for the object. The first query can be parsed to determine identifying information for the object, and a location can be determined for the object. The method further includes identifying one or more attributes of the object that are not specified in the first query, and causing a first set of data to be stored that characterizes the identifying information for the objet, the location of the object, and the one or more attributes of the object.

19 Claims, 7 Drawing Sheets

(56) References Cited

U.S. PATENT DOCUMENTS

| | | | | |
|---|---|---|---|---|
| 2015/0039596 A1* | 2/2015 | Stewart | ............ | G06F 17/30867 707/723 |
| 2015/0039597 A1* | 2/2015 | Raina | ...................... | G06F 17/30 707/723 |
| 2015/0269250 A1* | 9/2015 | Basovnik | .......... | G06F 17/30241 707/742 |
| 2015/0286643 A1* | 10/2015 | Kumar | .............. | G06F 17/30672 707/728 |

OTHER PUBLICATIONS

"AssitantEnhancer Customize Siri with Tons of Features", Technology Entertainment LifeStyle, Mar. 5, 2013, downloaded from the Internet on Feb. 4, 2015 at http://www.thenerdmag.com/assistantenhancer-customize-siri-with-tons-of-feature/, 9 pages.

Hill, Simon, "Our Siri Guide: How to Merge your Life with Apple's Witty Virtual Assitant", Digital Trends, Nov. 23, 2013, downloaded from the internet on Feb. 4, 2015 at http://www.digitaltrends.com/mobile/how-to-use-siri/, 9 pages.

Lee, Kevin, "Dude, where's my car? Google Now will remember where you parked", Techradar, May 1, 2014, downloaded from the Internet on Feb. 4, 2015, at http://www.techradar.com/us/news/software/operating-systems/dude-where-s-my-car-google-now-gets-parking-reminders-1246611, 8 pages.

Miller, Chance, "Google Search updated with new voice commands for easily calling/texting relatives". 9to5Google, Feb. 11, 2014, downloaded from the internet on Feb. 4, 2015 at http://9to5google.com/2014/02/11/google-search-updated-with-new-voice-commands-for-easily-callingtexting-relatives/, 4 pages.

Scuderi, Royale, "The 3 Best iPhone Apps to Help You Remember", Lifehack, downloaded from the Internet on Feb. 4, 2015 at http://www.lifehack.org/articles/technology/the-3-bestiphone-apps-that-help-you-remember.html, 6 pages.

Suba, Randell, "Spring Cleaning: 6 Apps to Help You Remember Where You Put Things", Innovative Artist App, downloaded from the Internet on Feb. 4, 2015 at http://innovativeartistapp.com/spring-cleaning-6-apps-to-help-your-remember-where-you-put-things/, 5 pages.

Lopez et al., "AquaLog: An Ontology-Portable Question Answering System for the Semantic Web," The Semantic Web: Research and Applications, vol. 3532 of the series Lecture Notes in Computer Science, pp. 546-562, May 19, 2005.

Yeh et al., "Multimodal question answering for mobile devices," Proceedings of the 13th International Conference on Intelligent User Interfaces, IUI '08, 1, pp. 405-408, Jan. 13, 2008.

International Search Report and Written Opinion for International Application No. PCT/US2015/036165, dated Nov. 5, 2015, 13 pages.

* cited by examiner

SAVING AND RETRIEVING LOCATIONS OF OBJECTS

CROSS-REFERENCE TO RELATED APPLICATION

This application claims the benefit of U.S. Provisional Application No. 62/031,186, filed Jul. 31, 2014, the entirety of which is incorporated herein by reference.

TECHNICAL FIELD

This document generally relates to information storage and retrieval.

BACKGROUND

In the course of daily lives, people encounter many different objects. Objects routinely must be kept track of so that they can be found after a period of non-use. Some objects are used frequently and routinely so that a user can generally recall where the object is located in accordance with the routine. For example, a user may charge her phone on a night stand each night, so that the phone can be expected to be on the night stand the next morning. Similarly, a user may leave his car keys in a tray near the garage when he returns home from work each day, so that the keys are easily located in the same spot the following morning. Sometimes, however, routine is broken and an object is left at an unusual location or lent to another person for a period of time. Other objects are used infrequently but must be readily accessible when needed (and some are even intentionally hidden), such as a hidden spare house key, a birth certificate, or a vehicle title.

SUMMARY

This document generally describes techniques for saving and retrieving information about the locations of objects. In some implementations, a user can instruct an application or service on a computing device to store information about the location of an object so that the location can easily be recalled at a later time upon request. For example, a user can provide a query indicating that George is borrowing her rock collection. In response to the query, an entry can be created in a data structure for the user that captures the location of the rock collection as being with George. Months later, the user may acquire a new stone for her collection, but cannot recall to whom she lent the collection or when. To facilitate her recollection, she may submit another query that requests the location of the rock collection, to which the application or service, based on the entry in the data structure, responds that the rock collection is with George. The user can also indicate when the location of an object has changed, so as to cause location information for an object to be updated in the data structure. Thus, when George returns the rock collection to the user, the return can be registered in the data structure so that the current location of the object is no longer represented as being with George. By maintaining the locations of various objects in a data structure, sophisticated actions can be performed in response to user queries. For example, notifications can be triggered when an object is moved from a particular location. In some implementations, object location entries are stored in a data structure in a manner that permits relationships to be identified among one or more objects and locations. For example, common objects or locations named in a series of queries can be recognized as being the same objects or locations that have previously been referenced so that information about the objects or locations can be reliably accessed or updated. Moreover, representations of objects or locations in the data structure can be automatically associated with one or more attributes. The objects or locations can then be identified by a user based on the attributes, even if the name of the object or location is not directly stated in a query.

The techniques described herein may provide one or more of the following advantages. Using simple, natural language queries, a user can save, update, and retrieve information about object locations such as information that indicates where an object was last left, or information that identifies a person, organization, or other entity that is in possession of the object. In some implementations, users can input object location queries by way of voice commands, which commands are then processed based on particular sets of grammar that have been trained on sample object location queries. The grammars can be used in a model that probabilistically determines a particular type of voice command that a query corresponds to, without requiring the user to speak the command using particular terms or particular language structure. Moreover, by associating stored objects and locations with one or more attributes (i.e., concepts that are determined to be sufficiently related to the objects and locations), users can subsequently refer to the objects and locations indirectly based on their attributes, rather than directly based on the object or location names. Therefore, information about an object or location can be requested or updated with greater flexibility than if strict recitation of the language that was originally used to store object location information was required. For example, object location information may first be stored in response to a user query that "The rock collection is with George." Later, the user may want to know where the rock collection is, but uses only a shorthand reference to the rock collection, such as "rocks" or "stones." The shorthand reference of "rocks" may be sufficient to identify the "rock collection" object by string comparison, and "stones" is a synonym associated with the rock collection that is also determined to be sufficiently closely related to the rock collection. Moreover, attributes can be determined about the rock collection and/or about George, such as his full name and address. Using such attributes, the user may inquire about any objects that are located at George's address, without naming George himself, for example. Likewise, a book may be named by its author, a DVD movie by the starring actor or actress, and a music album by its artist or genre, for example. Each of these examples indirectly refer to an object rather than directly naming the object itself. In addition, responses can be generated to more sophisticated queries by maintaining relationships among objects and locations in a data structure. For example, if object A was left at location X at a first time, and object B was left at location X at a second time, then location X can be associated with both objects, so that a user can obtain a response to a query that asks at once about all the objects that have been left at a particular location.

In some implementations, a computer-implemented method includes receiving a first query that includes one or more terms identifying an object. The first query can be determined to include a command to store location information for the object. The first query can be parsed to determine identifying information for the object, and a location can be determined for the object. The method further includes identifying one or more attributes of the object that are not specified in the first query, and causing a first set of data to be stored that characterizes the identifying information for the objet, the location of the object, and the one or more attributes of the object.

These and other implementations may include one or more of the following features. The method can further include determining that the object corresponds to one or more entities in a data structure of entities, wherein the data structure includes representations of a plurality of entities and maps relationships among particular ones of the plurality of entities. Identifying the one or more attributes of the object that are not specified in the first query can include selecting one or more facts or categories that are associated with the one or more entities in the data structure to which the object is determined to correspond.

The method can further include causing the first set of data for the object to be stored in a personal objects data structure associated with a particular user account, wherein the personal objects data structure: (i) includes representations of one or more objects and one or more locations, and (ii) maps relationships among particular ones of the one or more objects and the one or more locations.

The data structure can map the relationships so as to indicate at least a last known location for particular ones of the one or more objects.

The first query can further include one or more terms that identify the location of the object. The one or more terms that identify the location of the object can include one or more terms that specify a geographical location of the object.

The first query can further include one or more terms that identify a person or an organization with whom the object has been left. The method can further include associating the person or the organization with whom the object has been left with a contact from an account of a user; detecting a user interaction with the contact that is associated with the person or the organization with whom the object has been left; and in response to detecting the user interaction with the contact, causing a notification to be presented to the user pertaining to the object.

The method can further include determining that a user device is located within a threshold distance of the location of the object, and in response, causing a notification to be presented to a user pertaining to the object.

The first query may not include information that identifies the location of the object in content of the first query, and the location of the object can be determined based on a current location of a computing device at which the first query was originally entered or spoken.

The method can further include receiving a second query that includes one or more terms that identify at least one of the one or more attributes of the object. In response to receiving the second query, the method can further include determining, based on the one or more terms that identify the at least one of the one or more attributes of the object, that the second query references the object that was identified in the first query; determining that the second query comprises a command to perform an action associated with the object; and performing the action associated with the object.

The second query can include a command to retrieve the location of the object. Performing the action associated with the object can include identifying the location of the object from the first set of data and outputting the location of the object.

The second query can include a command to update information about the object. Performing the action associated with the object can include causing updated information to be stored in the first set of data or other data.

The command to update information about the object can include an indication that the object is located at a new location. Causing the updated information to be stored in the first set of data or the other data can include updating the stored location information for the object to specify the new location of the object.

The first query can specify that a user has left the object at the location of the object. The second query can specify that the object has been returned to the user. Performing the action associated with the object in response to receiving the second query can include causing information to be stored that indicates that the object is no longer located at the location of the object identified in the first query.

The second query can indicate that the object is no longer located at the location of the object identified in the first query. Performing the action associated with the object in response to receiving the second query can include causing information to be stored that indicates that the object is no longer located at the location of the object identified in the first query. The method can further include, in response to a determination that the object is no longer located at the location of the object identified in the first query, causing a notification to be presented to a user that includes a reminder about one or more events associated with the object.

The one or more terms in the first query that identify the location of the object can indicate that the object has been left with one or more first persons. The second query can indicate that the object has been returned from the one or more first persons, and the reminder about the one or more events associated with the object can include a reminder to make the object available to one or more persons.

The method can further include identifying one or more attributes of the location of the object that are not specified in the first query. The determination that the second query can include a command to perform the action associated with the object is further based on the one or more attributes of the location of the object.

The second query may not include any of the one or more terms that identified the object in the first query.

In some implementations, one or more computer-readable devices are provided that have instructions stored thereon. When executed by one or more processors, the instructions can cause performance of operations that include: receiving a query that includes one or more terms identifying an object; determining that the query comprises a command to store location information for the object; parsing the query to determine identifying information for the object, and determining a location of the object; identifying one or more attributes of the object that are not specified in the query; and causing a first set of data to be stored that characterizes the identifying information for the object, the location of the object, and the one or more attributes of the object.

In some implementations, a computer-implemented method can include: receiving, by a computing device, a first query that comprises a command to store information specifying a location of an object; causing a set of data to be stored that identifies the object and the location of the object; receiving, by the computing device, a second query that comprises a command to retrieve the location of the object, wherein the second query identifies the object by one or more terms that indicate one or more attributes of the object that were not specified in the first query; in response to receiving the second query: using the one or more attributes of the object to identify the object from among a plurality of objects, and retrieving the location of the object from the set of data; and outputting information for presentation to a user that identifies the location of the object.

BRIEF DESCRIPTION OF THE DRAWINGS

Like reference numbers and designations in the various drawings indicate like elements.

DETAILED DESCRIPTION

Figure 1:
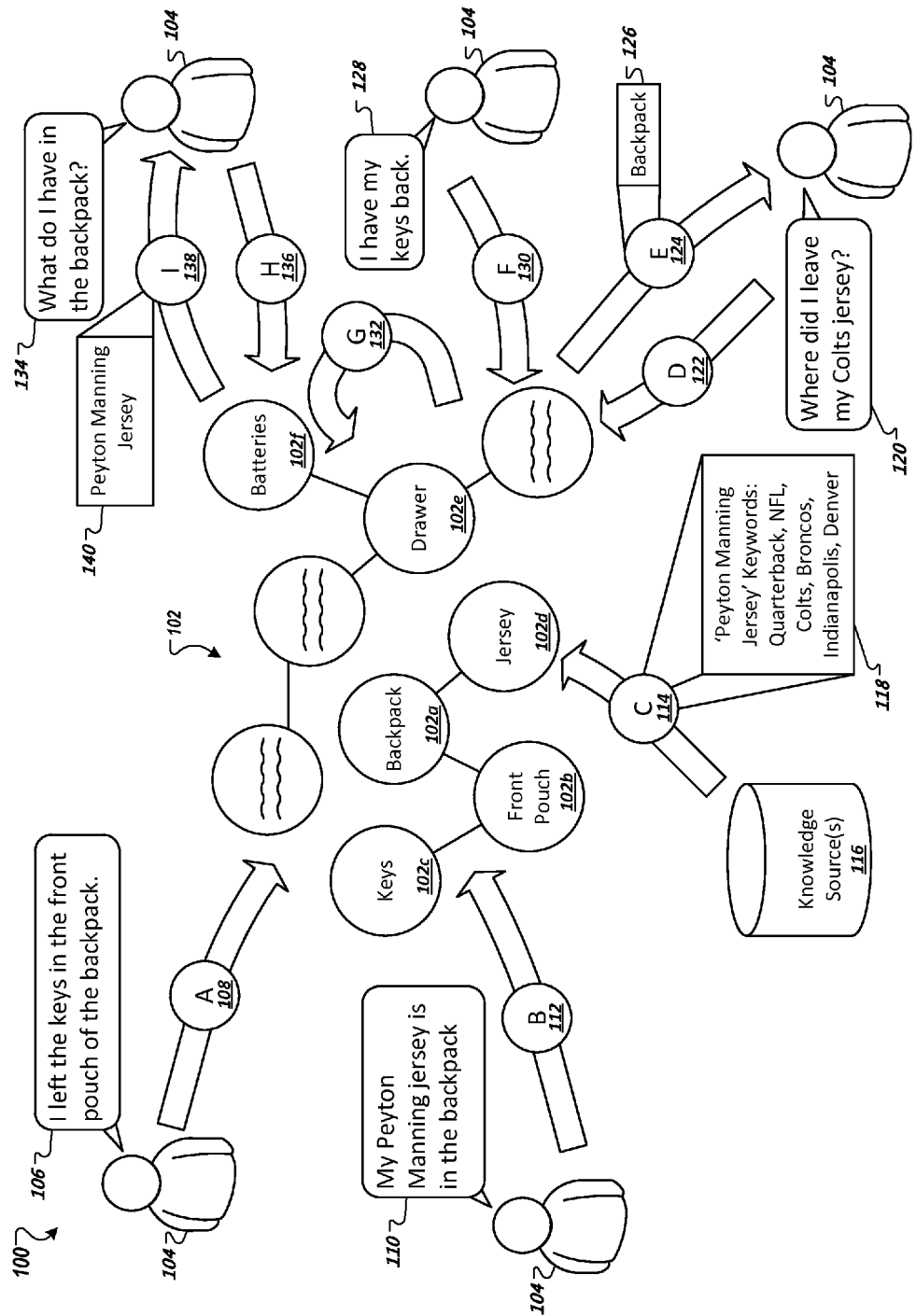
FIG. 1 is a schematic diagram of an example process for saving and retrieving information about the locations of objects.

FIG. 1 is a schematic diagram of an example process 100 for saving and retrieving information about the locations of objects. In some implementations, the process 100 may be carried out by the system 400, depicted in FIG. 4 below. Generally, the process 100 permits a user to use unstructured natural language queries to store information that indicates the locations of one or more objects. The process 100 can build a personal objects data structure that maps relationships among objects and their locations. The personal objects data structure can be used to respond to user queries that refer to objects and locations indirectly or otherwise in different ways among successive queries. For example, based on particular paths through the personal object data structure, one object may be identified in a query based on its relationship to another object; objects can be associated with a location hierarchy (e.g., a shoe may be directly located in a closet, and the closet may be located in the guest bedroom of Sue's house); objects may be related by location; and object location histories can be determined. Moreover, objects and locations in the personal objects data structure can be associated with attributes that represent concepts related to the respective objects and locations. As described further below, the process 100 permits a user to identify an object or location along one or more dimensions, such as by direct use of the object or location name, partial or shorthand references to the object or location name, and by indirect reference to one or more determined attributes of the object or location. Therefore, a user is not required to remember the particular terms that were originally used to describe an object and its location, but can instead later identify a previously stored object or location using a flexible vocabulary with a broader base of terms that are descriptive of the object or location.

The process 100 begins at stage A (108), where a user 104 provides a query 106 that includes an object-location storage command. The query 106 states that the user 104 has "left the keys in the front pouch of the backpack." Here, the query 106 is shown as a voice command uttered by the user 104, although the query 106 may also be entered by other means, such as by typing the text of the query 106 on a physical or virtual keyboard. The query 106 can be input on a user computing device, such as a smartphone, tablet, netbook, wearable device (e.g., smartwatch), or desktop computing device. The query 106 can be provided to an objects-and-location engine ("O&L engine"), that processes queries, maintains a personal objects data structure 102 (e.g., a database, or another data repository), and performs one or more operations in response to queries. In this example, the process 100 determines that the query 106 is an object-location storage command using a model that has been trained on various types of object-location queries for different types of object-location commands. Different operations can be performed in response to different command types. Even though the query 106 does not include a prefix or other carrier phrase (e.g., a hotword) that specifically corresponds to an object-location storage command (e.g., "Remember that I left the keys in the front pouch of the backback"), the model used by the O&L engine can determine from the context of the query 106 that it is most likely an object-location storage command, and not, for example, an objects information retrieval command. In some implementations, however, the O&L engine can be configured to permit or require command prefixes in the query that identify the type of command.

In response to receiving the query 106, the process 100 adds entries to the user's personal objects data structure 102 to represent that the object "keys" has been left at the location "front pouch of the backpack." An example representation of the personal objects data structure 102 is shown in FIG. 1. The personal objects data structure 102 is represented graphically here as a graph including nodes for respective objects and locations, and edges that link the nodes and establish relationships among the objects and locations. In some implementations, the location named in the query 106 may be recorded in the personal objects data structure in the manner the location was identified in the query 106. For example, the string "front pouch of the backpack" may be stored as the location of the keys. In some implementations, the named location may be separated into its component parts, and separate, but related locations created for each part in the data structure 102. Here, the location in the query 106 specifies a location hierarchy. The "backpack" is a first location that may be identified generically. However, the backpack also has sub-components including various compartments such as the "front pouch." The "front pouch" can thus be an individually identifiable element in the data structure that is a sibling of the "backpack." Therefore, the backpack node 102a is connected to front pouch node 102b, which is in turn connected to the keys node 102c to indicate that the keys 102c are currently located in the front pouch of the backpack. If the backpack was previously represented in the data structure 102, additional or otherwise updated connections are made to the representation of the backpack so as reflect the addition of the keys to the backpack. Thus, new queries can cause the O&L engine to make changes to and build upon the data structure 102 if the data structure 102 previously existed. If a data structure 102 did not previously exist, one may be created.

At stage B (112), a second query 110 is provided by the user 104. The second query indicates that the user's "Peyton Manning jersey is in the backpack." An additional entry can be made to the personal objects data structure to reflect that an additional object is located in the backpack. Thus, the jersey node 102d is added and connected to the backpack node 102a.

At stage C (114), the process 100 identifies one or more attributes that are determined to be relevant to the jersey object 102d named in the query 110. The attributes are associated with the object so that they may be later used to identify the object in response to future user queries that describe the jersey differently than how it was described in query 110. In some implementations, the process 100 can tag an object or location with additional keywords for the determined attributes. For example, the representation of the jersey named in query 110 is tagged with keywords 118 "quarterback," "NFL," "Colts," "Broncos," "Indianapolis," and "Denver." The keywords 118 can be determined from one or more knowledge sources 116. In some implementations, the knowledge sources 116 may include or point to electronic resources such as web pages and other electronic documents whose content discusses the object or location that the query is referring to. In some implementations, the knowledge sources 116 may include a curated data structure that includes information about real-world entities including various people, places, things, and ideas. Attributes (e.g., facts, topics, categories) for the entities can be organized in the data structure. Therefore, a corresponding entity for an object or location in a query can be identified, and the attributes in the external entities data structure for the identified entity can be associated with the object or location in the query. For example, the professional quarterback, Peyton Manning, can be identified as a highly relevant entity for the "Peyton Manning jersey" object named in the query 110. The keywords 118 are attributes associated with the Peyton Manning entity, and therefore can be associated with the jersey object in the personal objects data structure 102 as well.

At stage D (120), the user 104 submits an object-location retrieval command in query 120 that asks, "Where did I leave my Colts jersey?" Although the user 104 would like to know the location of his Peyton Manning jersey, as the object was previously described in query 110, the later-submitted query 120 uses a different description of the same object: "Colts jersey." Nonetheless, at stage E (124), the process 100 correctly determines that query 120 is most likely referring to the "Peyton Manning jersey" that was earlier named in query 110 and that is represented in the personal objects data structure as node 102d. The correlation between the respective references to the "Colts jersey" and the "Peyton Manning jersey" is determined based on the keywords for the attributes of the jersey that were identified at stage C (114). The process 100 identified that Peyton Manning had a strong association with the "Colts," and therefore the term was tagged to the representation of the jersey 102d. A match could then be determined between content in the retrieval query 120 and the attributes of the jersey representation 102d.

At stage F (130), the user 104 submits a fourth query 128, "I have my keys back." This query 128 constitutes an object-completion type command indicating that the keys have been returned. The process 100 can identify from the context (e.g., structure and terms) of the query 128 that the query 128 is an object-completion type command, and in response, update the personal objects data structure 102 at stage G (132) to reflect that the keys are no longer located in the front pouch of the backpack. For example, although not shown in FIG. 1, the representation of the keys in data structure 102 may be removed. In some implementations, a current location of an object represented in the data structure 102 may be expired in response to a completion-type command rather than the object being deleted. In this way, the location history of an object can be analyzed.

The change made at stage G (132) in response to query 128 is illustrated at stages H (136) and I (138). At stage H (136), the user 104 asks in query 134, "What do I have in the backpack?" Because the personal objects data structure 102 has been updated to reflect that the keys are no longer in the backpack, at stage I (138), the process 100 responds to the fifth user query 134 with the answer, "Peyton Manning jersey," which is now the only object remaining in the backpack.

As noted above, among the one or more knowledge sources 116 that can be accessed to identify attributes associated with an object or location named in a query is an entities data structure. Examples of such a data structure are depicted in FIGS. 2A and 2B.

Figure 2A:
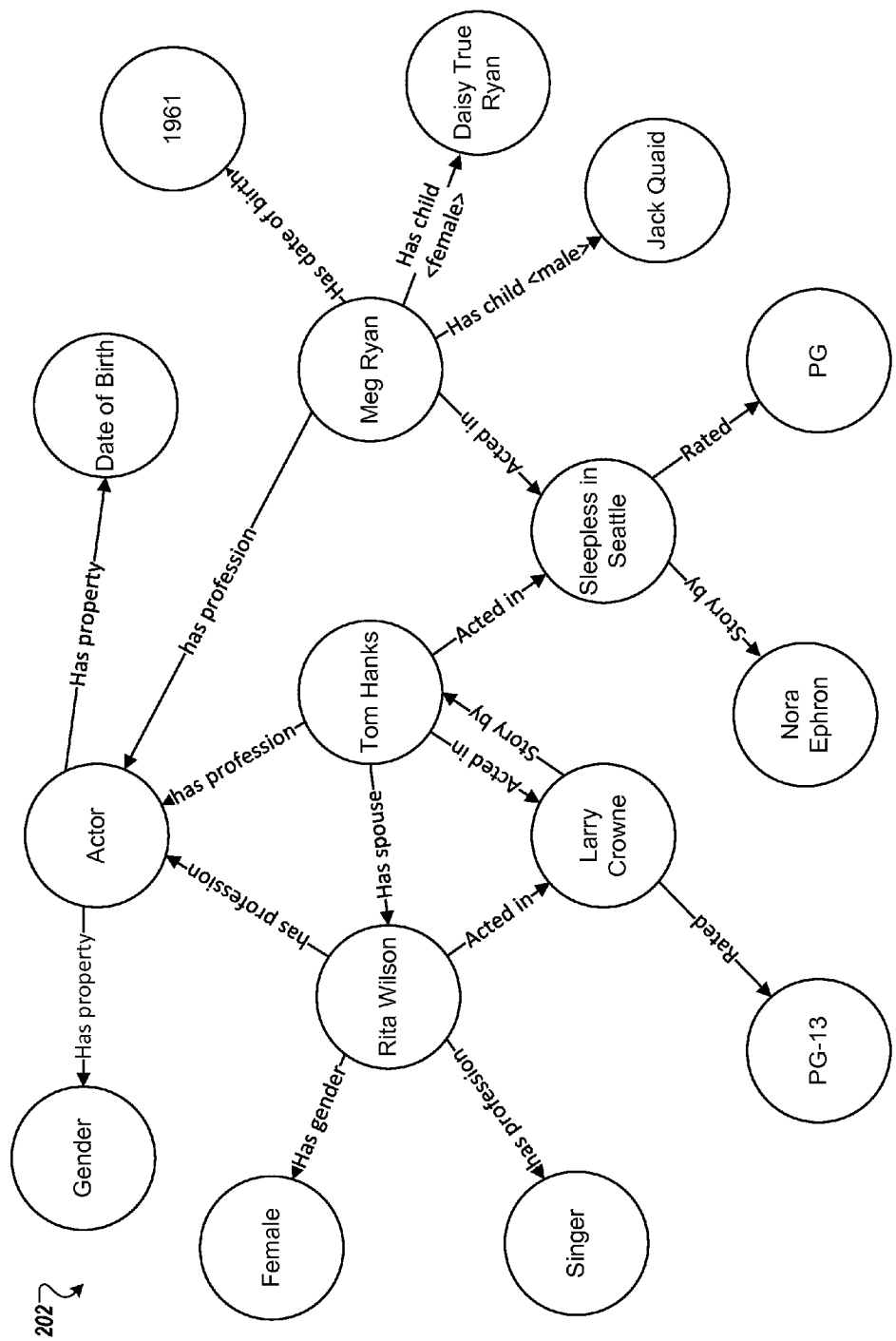
FIG. 2A is an example graphical representation of a data structure of entities in which particular ones of the entities are interconnected.

FIG. 2A is an example graph 200 of an entities data structure in accordance with an example implementation of the techniques described herein. The data graph 200 may represent the storage and structure of information in a data structure of interconnected entities. Such a data graph 200 stores information related to nodes (entities) and edges (attributes or relationships), from which a graph, such as the graph illustrated in FIG. 2A can be generated. The nodes 202 may be referred to as entities, and the edges 204 may be referred to as attributes, which form connections between entities.

Figure 2B:
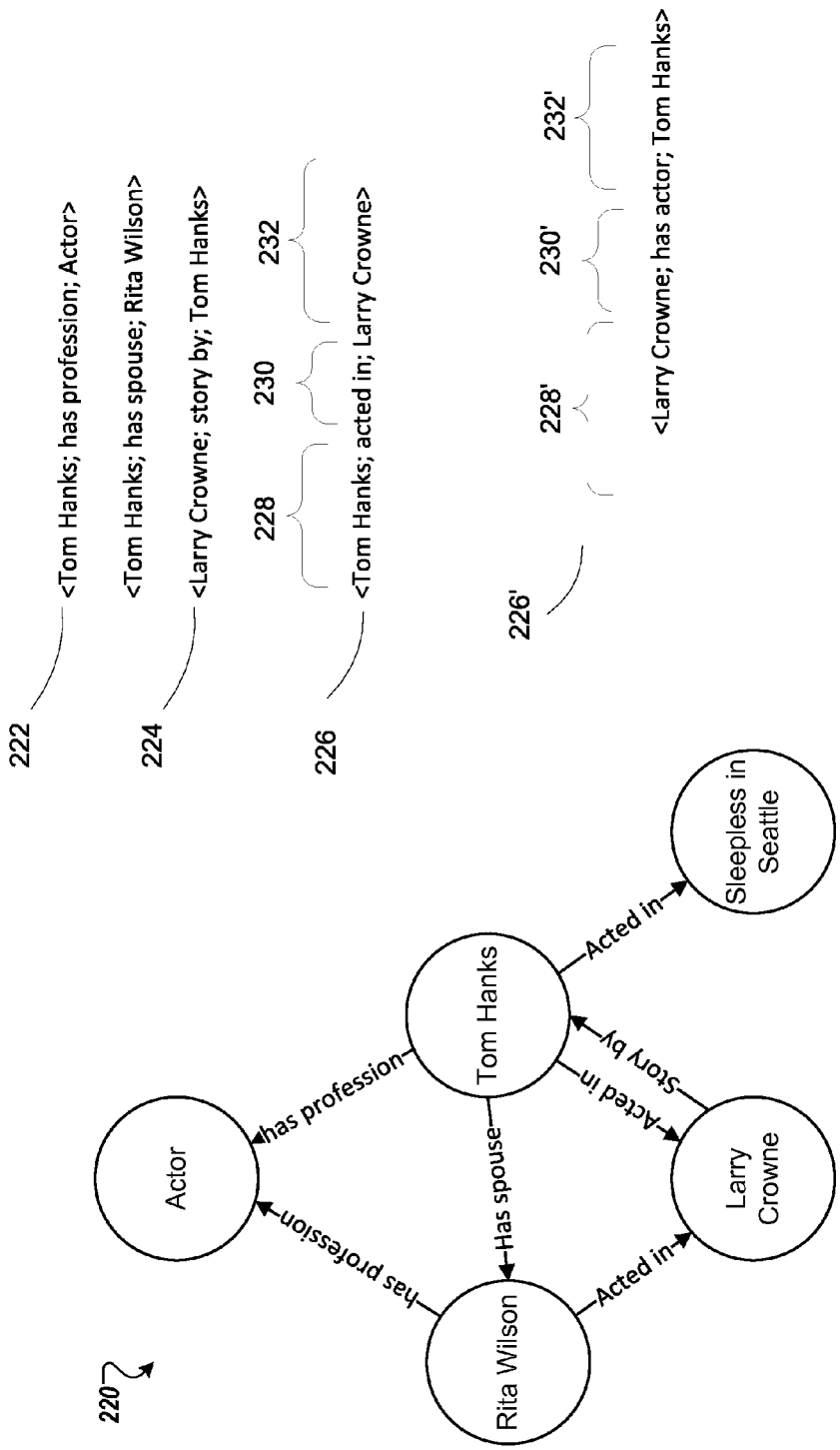
FIG. 2B depicts an example portion of a data structure of interconnected entities.

FIG. 2B depicts an example portion of a data structure 220 of interconnected entities. In some implementations, the data structure 220 may store information about entities in the data structure in the form of triples. For example, triples identify a subject, property, and value in the triples. Tom Hanks is an entity in the data structure 220 and is the subject of the triples. A first of the triples 222 identifies the property 'has profession,' and a second of the triples 222 identifies the property 'has spouse.' The value of the property is the third component of the triples. Tom Hanks has profession 'Actor' and has spouse 'Rita Wilson.' In the first of the triples 222, the property (attribute) has a value that is a fact in the data structure. Actor may or may not be an entity in the data structure, for example. In some implementations, the value component of the triplet may reference a classification of the entity (e.g., Actor) from which a named-entity recognition engine can determine a class for an entity mentioned in a text sample. In the second of the triples 222, the value component is another entity in the data structure 220, particularly the entity for Rita Wilson. Thus, the triple 222 specifies that the entity for Tom Hanks is connected or related to the entity for Rita Wilson by a spousal relationship. Additional triples, and their conversely related triples are shown in triples 224, 226, and 226'.

Figure 3:
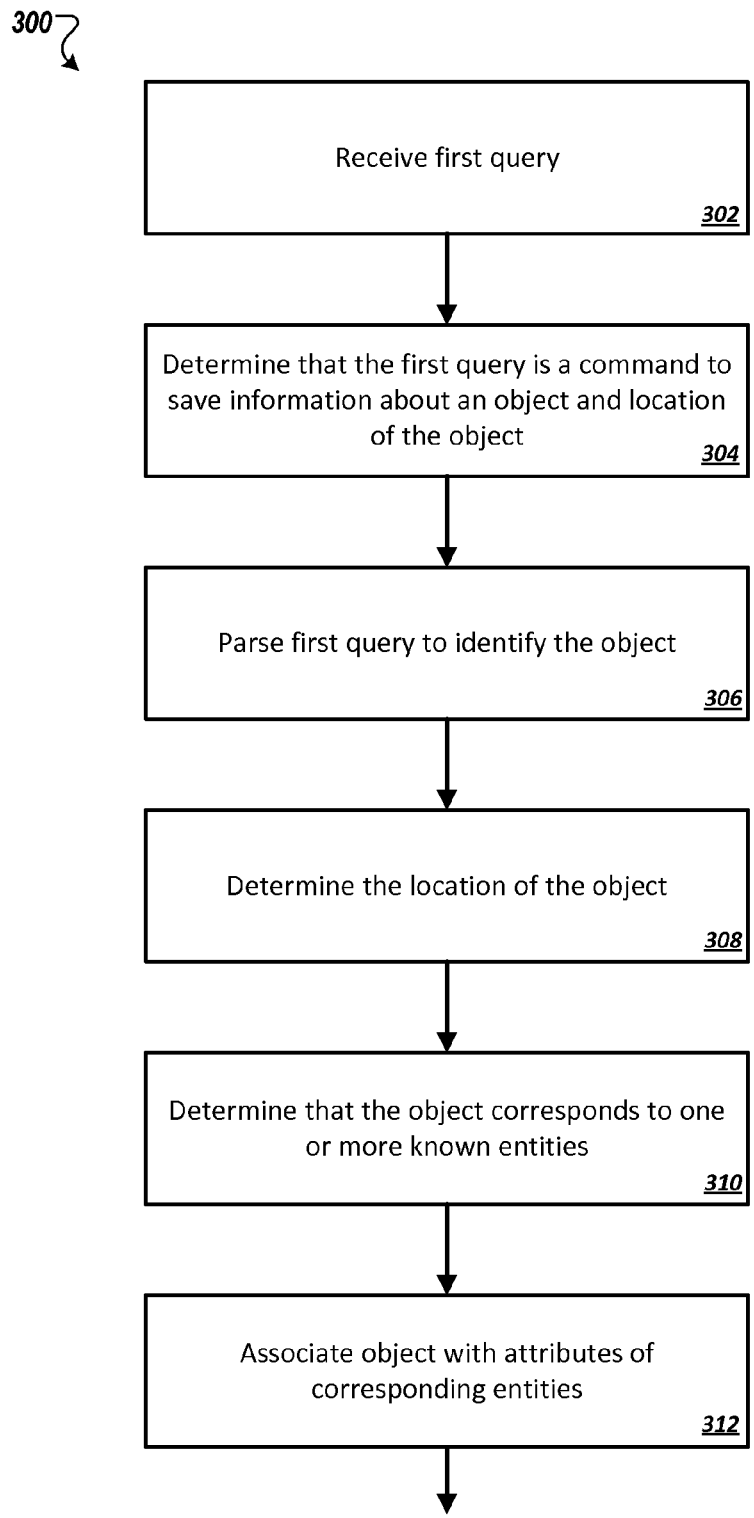
FIG. 3 shows a flowchart of an example process for saving and retrieving information about the locations of objects.
Figure 3:
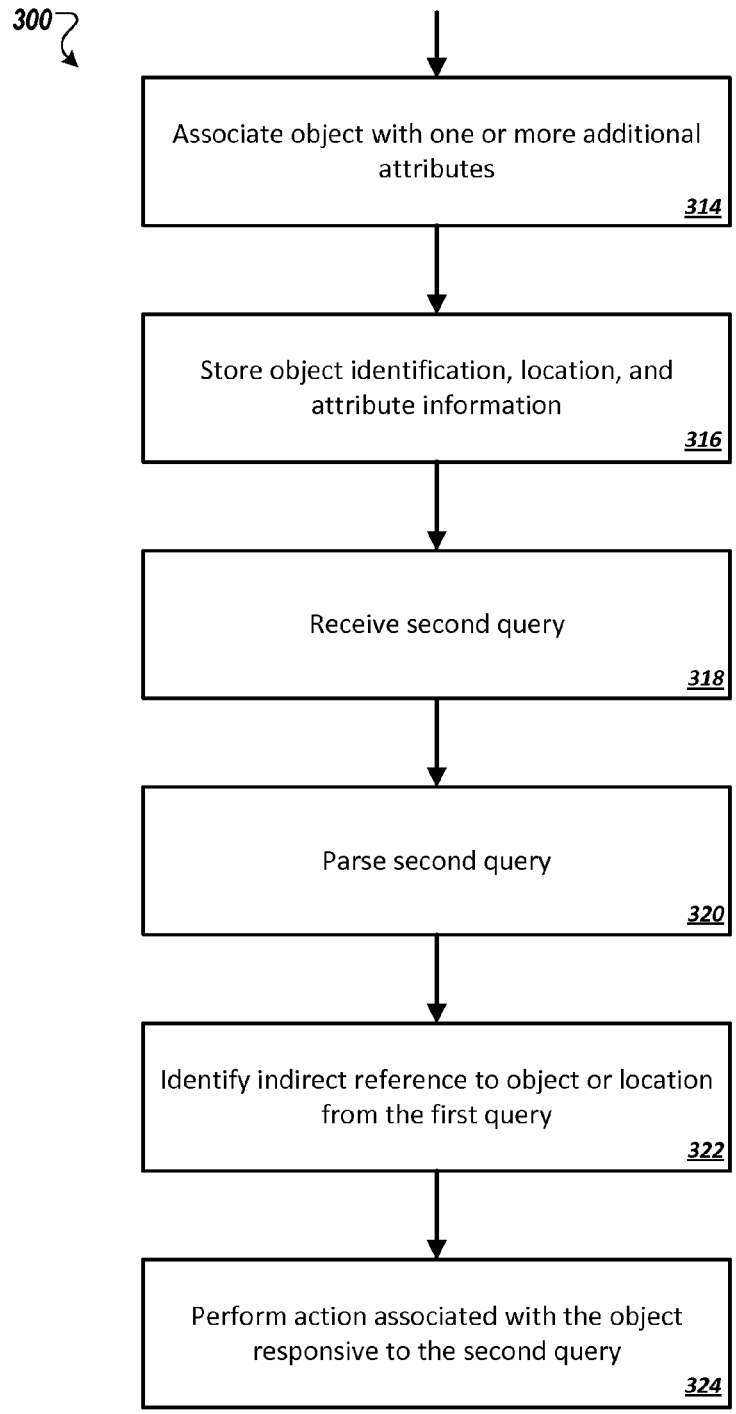

With reference to FIG. 3, a flowchart of an example process 300 is shown for saving and retrieving information about the location of objects. In some implementations, the process 300 can be carried out by any of the systems described in this paper, such as the system 400 depicted in FIG. 4. The process 300 can be performed on one or more devices. For example, the process 300 may be performed locally on a user device (e.g., smartphone, tablet, notebook computer), on one or more servers, or may be performed partially locally on a user device and partially remotely on one or more servers.

The process 300 begins at stage 302 at which a user query is received. The query can be a structured query, a syntactic query, or a natural language query, for example. The query may be typed or spoken by a user. For example, the query may be issued as a voice command that is processed by a speech recognizer and at least partially converted to text. On a user device, a user may access a voice assistant or other voice application that accepts spoken input and that processes the input to determine one or more actions to take in response. For example, the query may be issued to a voice assistant that is configured to respond to various spoken commands (e.g., to send messages, to launch applications, to save data, to set application parameters such as an alarm clock, or to perform general web searches).

Among one or more commands that the voice assistant may be configured to respond to are commands for object location storage and retrieval. At stage 304, the process 300 determines whether the received query corresponds to one or more object location commands. If the query was a voice query, the utterance can be transcribed to text using an automatic speech recognizer. The speech recognizer may include multiple grammars that correspond to different object location commands. In some implementations, a carrier phrase in the query may specifically identify the particular command. For example, in the query "Remember that Jane has my chemistry book," the carrier phrase "Remember that" may indicate that the query is a command to save the location of an object.

In some implementations, the speech recognizer may include multiple grammars that each correspond to a respective type of object location command. For example, the speech recognizer may include an assertions grammar, a completions grammar, a retrieval grammar, and a trigger actions grammar. Each of the grammars may be used to determine a particular type of object location command that a query corresponds to. The grammars may be trained on text samples (e.g., natural language queries) that correspond to natural ways that users speak object location commands in a language. In this way, for example, a carrier phrase may not be necessary for a voice assistant or other application to determine that a query is a particular type of object location command. Instead, the naturally used words and structure of a query may be sufficient to determine which type of object location command that the query corresponds to, even if no required carrier phrase or other keywords are included in the query. For example, the queries "My chemistry book is with Jane," "Jane has my chemistry book," and "The chemistry book is at Jane's" may all be recognized using assertion grammars as being commands to store information about the location of an object.

The assertion grammar is usable to determine that a query is a command to store information about the location of an object. Some query patterns that may be recognized with the assertion grammar as a command to store objection location information include [$X is at $Y], [I lent $X to $Y], [I borrowed $X from $Y], [$X is in $Y], [$Y has $X], [I left $X with $Y], [Remember that $X is in the $Y]. Additional or other query patterns may be understood by the assertion grammar for object location storage commands as well, which may be determined by statistical training on object location storage command samples, for example.

The completion grammar is usable to determine that a query is a command to register that an object has been returned or is otherwise no longer located at previously stored location. For example, if a user had made the assertion that "I lent 'James and the Giant Peach' to Fred," so as to cause the system to store information about the book 'James and the Giant Peach' being with Fred, then at a later time, an object completion command may be received from user input that "Fred returned 'James and the Giant Peach.'" The completion command indicates that the book has been returned or is otherwise no longer located at a previously stored location, and the completion grammar is usable to recognize queries that are completion commands. For example, the completion grammar may recognize query patterns for completion commands such as [$X returned $Y], [I got $X back], [Clear location of $X], [$X is no longer at $Y], etc. Additional or other query patterns may also be understood by the completion grammar, which may be determined by statistical training on object completion command samples, for example.

The retrieval grammar is usable to determine that a query is a command to identify the respective locations of one or more objects. Once the location of an object has been stored in response to an object location storage command, then at a later time, the user may submit an object retrieval command to determine to recall where an object is located. For example, the location of a photo album that has previously been registered as being located in an attic cabinet can be recalled to the user in response to the query "Where is the photo album?" The process 300 can then identify that the photo album is located in the attic cabinet, and present to the user an indication that the photo album is located in the attic cabinet. The response may be presented immediately in a textual message to the user such as an e-mail, SMS, or application text. In some implementations, the response may be a spoken response such as by speech synthesis. The retrieval grammar may recognize query patterns for retrieval commands such as [Where is $X?], [Where are $X, $Y, and $Z?], [Where did I leave $X?], [Who has $X?], [Did I leave $X somewhere?], [Is $Y borrowing $X?], and others which may be determined by statistical training on object location retrieval command samples, for example. In some implementations, the retrieval grammar may recognize retrieval commands that request identification of one or more objects that are stored at one or more locations. For example, a user may ask "What are all of the items in the kitchen drawer?," to which the process 300 may respond with the names of one or more items in the kitchen drawer.

The trigger actions grammar is usable to determine that a query is a command to perform a specified action upon the occurrence of an event. The action and the event on which the action is conditioned may each be specified by the user, or may be determined without being specified by the user by using context or default settings. In some implementations, the event may be that an object has been left or returned from a given location. In some implementations, the action may be to remind the user to do something with the object. For example, on January 5, a user may record that he lent his "Harry Potter" collection to Sam. A week later, Jill tells the user that she would like to borrow the user's "Harry Potter" collection as soon as the collection is available. The user can speak a voice query that commands that he be reminded to lend the "Harry Potter" collection to Jill when it is available. The command can be recognized using the trigger actions grammar. For example, the user may say, "Remind me that Jill wants the 'Harry Potter' collection when Sam is done with it." Alternatively, the command may not include the condition, but may instead be implied: "Remind me that Jill wants the 'Harry Potter' collection." From such commands, the process 300 can generate a reminder about providing the 'Harry Potter' collection to Jill. Reminders may be periodically presented to the user, or the user may ask what reminders he has set. In some implementations, the reminder is provided upon the occurrence of a completion event. For example, when Sam returns the object to the user, the user may speak a completion command, "I got the "Harry Potter" collection back." In response to registering the completion command, the process 300 may present any relevant reminders to the user about the object, such as "Reminder that Jill would like to borrow your 'Harry Potter' collection." In some implementations, the reminder can be provided upon the occurrence of an assertion (e.g., object location storage command). For example, the user may set a first reminder in May that he must have his football pads ready for practice by August 1. In June of that same year, the user may submit an object location storage command indicating that Bobby is borrowing the football pads. Upon issuing such command, the process 300 may remind the user that the football pads must be returned by August 1 in time for practice. The process 300 may also remind the user at particular times in advance of the August 1 deadline that Bobby needs to return the football pads by August 1. Moreover, if the user makes a retrieval command, e.g., "Where are my football pads?," the process 300 can respond to the user with an indication of the location of the football pads (with Bobby), and also with a reminder that the football pads are needed by practice on August 1. In some implementations, the user can specify that a reminder about an object and/or its location be provided to the user at particular times or recurrently.

In some implementations, the trigger actions grammar can be used to set a notification event that reminds a user that an object has been left at a particular location when the user interacts with a representation of the location. If a user indicates that an object has been left with a particular person (or a particular organization or other entity generally), a contact corresponding to the person with whom the object was lent can be determined, such that when the user interacts with the contact (e.g., sends an e-mail, an SMS message, a video call, social media communication, phone call to the contact), a reminder can be presented that the object is located with the person corresponding to the determined contact. For example, if a user lends her snow shovel to Paula, the next time that the user calls Paula or that Paula calls the user, a message can automatically be displayed to the user that reminds the user that Paula has the snow shovel. In some implementations, a geographical location can be determined for the named location for an object from a query, and a notification can automatically be generated when the user (or the user's device) determines that its current location is within a threshold distance of the determined geographical location. For example, a reminder message about the snow shovel can be presented when the user drives through Paula's neighborhood so that the user can conveniently pick up the object, for example, while the user is in Paula's area.

In some implementations, a query can include different combinations of one or more objects, one or more locations, and one or more commands. For example, a compound query may be of the form [$A is at $X, and $B is at $Y], or [Where are $A and $B located?]. In such cases, the process 300 can parse the query and perform similar actions for each of the components of the query in a similar manner as is done with single component queries that are generally discussed in this paper for simplicity. For example, a respective grammar may be used to recognize each component of a compound query, which grammars may be the same or different depending on whether the individual components of the query are directed to different commands. In some implementations, a single command may be issued, but the process 300 can recognize multiple objects and/or multiple locations associated with the command. For example, the object location storage command "My hat and scarf are in the glove compartment" can be separated into the separate assertions that the hat is in the glove compartment and the scarf is in the glove compartment, and such information may be stored as if separate assertions had been made for each of the hat and the scarf objects.

At stage 306, upon determining that the query includes a particular type of object location command, the process 300 parses the query to identify the object named in the query. One or more objects may be identified from the query. In some implementations, the name of the object may be extracted from the query and stored substantially in the manner that the object was provided in the query. For example, given the object location storage command, "The Colts jersey is in the wash room," the "Colts jersey" string can be extracted and stored in a personal objects data structure in the "wash room" location. In some implementations, one or more related terms may be identified for the object that can be stored or used (depending on whether the query is a storage, completion, or retrieval command, for example) in place of or in addition to the original object string extracted from the query. For example, synonyms or spell-corrected terms may be identified for an object. Thus, the phrase "Indianapolis Colts jersey" with the full team name may be identified based on the partial name "Colts jersey" as used in the natural language query. In some implementations, an extracted object string may be compared to other objects that have previously been stored and associated with locations in a personal objects data structure. If the extracted object string or a related term is determined to be similar or related to an existing (previously stored) object, then it may be determined that the two objects are the same. If two objects are the same, an additional entry in a personal objects data structure may be created for the new instance of the object, which may be linked to the previously stored object. In some implementations, if two objects are determined to likely be the same object, then additional or updated parameters may be generated for the existing representation of the object stored in the personal objects data structure. For example, if a wrench set was previously located in the tool shed, but a new query indicates that the wrench set is now located in the garage, then the original wrench set object representation may be accessed, and its current location updated from the tool shed to the garage. In some implementations, an object string may be extracted from the query and an entry stored for the object without performing a comparison of the extracted object string to other objects at the time of extraction and storage. At a later time, when a retrieval or completion command is received from a user, for example, the process 300 may identify all entries that match the retrieval or completion command, including identifying common objects. For example, the user may assert that his 'cards' are in the office at a first time, and then at a later time assert that his 'deck of cards' is in the basement. The determination as to whether the 'cards' object and the 'deck of cards' object are the same may be performed when the 'deck of cards' assertion is made, or may be performed when a user later asks, "Where are the last two places that I left my cards?" If the process 300 determines that the partial object string 'cards' identifies the same object as the 'deck of cards,' then the process 300 may respond to the last query with an indication that the last two locations for the cards were the basement and the office.

At stage 308, the process 300 identifies the location of the object from the query. The location may be identified using similar techniques to those used to identify the object from the query. For example, the query may be parsed, and one or more words extracted that correspond to the location for the object. For an object location storage command, the one or more words that correspond to the location may be saved in the personal objects data structure and associated with the object. In some implementations, the object location specified in a new query may be determined to be the same as other locations in the personal objects data structure that have been previously recorded. In some implementations, a relationship may be determined among multiple locations identified in a particular query and/or among locations in a query and locations that have been previously recorded in the personal objects data structure. For example, a previously saved location in the data structure may be "office." A new query may indicate that an object is located in the "office closet." A hierarchical relationship may be established between the office and the office closet so that the object in the office closet may also be identified as being in the office, although not all office objects may be in the office closet. In some implementations, geographical location information may be associated with an object rather than a conceptual location. For example, a geographic location may be implied from some queries that do not explicitly recite a location, or from queries that do recite a location for which a geographic location can be identified. Thus, the query "Remember that I left my car here," may cause the process 300 to use locating means such as GPS to determine the geographic coordinates of the device that received the query, and such coordinates can be recorded as the current location of the car. In another example, a user might say that "I left my coat at Jerry's World Famous Deli." The geographic location of Jerry's World Famous Deli may be determined, and may be stored rather than or in addition to the name of the deli in the personal objects data structure.

At stage 310, the process 300 determines that the object identified from a query corresponds to one or more entities. Entities can include persons, places, things, or ideas, for example. Examples of entities are wide ranging and may include anyone and anything from President Barack Obama and the Constitution of the United States of America to Jon Bon Jovi, reality shows and kangaroos, to books, movies, businesses, and more. The one or more known entities may have been previously identified, or may be identified after a query is received. In some implementations, where the entities have been previously identified, the entities may be indexed in a data structure of entities. The data structure may include one or more sub-data structures and may be represented as a graph, in some implementations (see e.g., FIG. 2A). For example, each entity may be represented by a node in the graph, particular ones of the entities may be connected to each other in the graph by way of one or more relationships (e.g., the entity representing J. K. Rowling may be connected to the entity representing the book 'Harry Potter and the Philosopher's Stone' through a bi-directional relationship that indicates that J. K. Rowling authored the book), each of the entities may be associated with a respective set of attributes, and the entities may be associated with one or more topics (categories). For example, the entity representing J. K. Rowling may be connected to other entities such as the entity representing Yate, United Kingdom as the author's place of birth. The J. K. Rowling entity may also have attributes associated with her such as date of birth, interests, etc. Information about entities may be hand-seeded by users and/or may be scraped from publicly available information (e.g., web pages, blogs, and other electronic documents) and relied upon as accurate data about an entity if at least a threshold level of confidence is determined based on the information source (e.g., based on the reliability of the source of the data, the frequency that the data is repeated across multiple sources, and the staleness of the data). The entities data structure may be represented, in some implementations, in a manner similar to the entities graph 202 depicted in FIGS. 2A and 2B. In some implementations, information about an entity that corresponds to an object or a location in a query can be identified after receipt of the query, such as by performing an internet search based on the query in order to identify publicly available information that is relevant to the query.

At stage 312, one or more attributes are determined about the entities that have been determined to correspond to the object specified in the query. The attributes of the entity are generally usable to identify additional information that is relevant to the object but that was unspoken in the query. The stored object can then be tagged or otherwise associated with the attributes of its corresponding entities so that users can subsequently identify the object by reference to the attributes. In some implementations, additional keywords are associated with the object based on the attributes. For example, in response to a query indicating that a user has left her copy of "To Kill a Mockingbird" with Ryan, data is caused to be stored in the personal objects data structure representing that the object "To Kill a Mockingbird" is currently at the location with "Ryan." The object "To Kill a Mockingbird" may be determined at stage 310 to correspond to the classic novel by Harper Lee (i.e., the novel is the entity to which the query object corresponds in this example). Since the object referenced in the query is determined to likely correspond to the novel, additional attributes about the novel can be associated with the object. Thus, the author's name (Harper Lee), original publication year (1960), themes (racial injustice, law), genre (Southern Gothic, fiction), and major characters (Atticus Finch) are all attributes that describe the book. Keywords can be identified from the attributes and associated with the stored object, such as "book," "Harper Lee," 1960, "racial injustice," "law," "Southern Gothic," and "Atticus Finch." Thus, even though the user originally indicated that "To Kill a Mockingbird" was with Ryan, different terms can be used to later reference the object. For example, the user may issue a retrieval command, "Who has my book about Atticus Finch?" or a completion command, "The book by Harper Lee has been returned," and the process 300 can then identify that the object in these subsequent commands is the "To Kill a Mockingbird" book that Ryan had borrowed. Similarly, synonyms, short-hand object names, full-length object names, categories, and topic or category information can be tagged with an object so that the object can be referenced using alternative terms from the terms that were previously used to save information about the object.

In some implementations, entity attributes can be identified by accessing an entities data structure that includes information about entities and their relationships. Sometimes, multiple entities may be determined to correspond to an object in a query. For example, "To Kill a Mockingbird" might not refer to the book, but instead to the 1962 film adaptation of the book starring Gregory Peck. Where the object specified in the query is ambiguous, and may correspond to one of multiple different candidate entities, then attributes from one or more of the candidate entities may be associated with the object.

To facilitate selection of candidate entities, confidence scores can be determined for the candidate entities that reflect respective likelihoods that each candidate entity matches the object indicated in a user query. The confidence score can be used to select which entities' attributes to associate with an object. In some implementations, the attributes of the n entities having the n highest confidence scores can be associated with an object. In some implementations, only entities whose confidence scores meet (e.g., exceed) a threshold confidence score may have its attributes associated with an object. The confidence score for an entity may be based on one or more factors including the context of the query that named the object, and the frequencies with which respective entities are found in one or more corpora of electronic resources. For example, the book "To Kill a Mockingbird" may be discussed ten times more frequently than the movie on internet pages or other resources that include the phrase "To Kill a Mockingbird." Therefore, the entities data structure may include information indicating the relative popularity of the book as compared to the movie, and such information may result in the confidence score for the book being higher than the confidence score for the movie. Similarly, if the query itself included context that disambiguated candidate entities, such context could be used to influence the confidence scores of the candidate entities. For example, it is clear from the query, "The DVDs for 'To Kill a Mockingbird' are at Ryan's place," includes a reference to the movie, rather than the book. The confidence score for the movie entity could therefore be made higher than the confidence score for the book in this example, and the attributes for movie could be associated with the object specified in the query, rather than the attributes for the book.

At stage 314, one or more additional attributes that are not associated with a corresponding entity can be associated with the query object. The additional attributes can include terms, phrases, and other information that relate to the object but that are not necessarily identified from an entity for the object. Even where a corresponding entity cannot be identified from an entities data structure for an object, other information sources may indicate relevant attributes for the object. For example, a personal object that has a particular, and possibly private, meaning may not be an entity represented in an entities data structure (which may be generated based largely on publicly available information). Thus, "Grandma's hand-knit sweater" may be an object without an entity in the entities data structure. Still, keyword attributes such as "Grandma," "family," "heirloom," "sewn," and "shirt" may be associated with the object to permit expanded retrieval capabilities when the object is later referenced in a query by the user. The additional attributes may be identified in some implementations by accessing a thesaurus to determine keyword synonyms, by identifying related (but not corresponding) entities from an entities data structure, and/or by performing a web-based search for the object and identifying keywords from relevant search results.

Additional attributes for an object can also be determined based on user account data. For example, an object may be described in data stored in an account associated with the user, which description can be parsed to identify keyword attributes to associate with the object. This can be beneficial, for example, to determine attribute information for objects regardless of whether an entity corresponding to the object is represented in an existing entities data structure. Thus, keywords or other data derived from the description of an object from a user's e-mails, applications, social media accounts, profile information, or other sources can be stored in association with an object in a personal objects data structure. A user may opt-in or opt-out of having user account data analyzed for such purposes, and may restrict what data is analyzed.

At stage 316, information identifying the object specified in the query, the location of the object, and any attributes associated with the object are stored in a personal objects data structure. The personal objects data structure may include a collection of data structures in one or more locations so that the data, although associated, may or may not be stored together. Information may be stored at stage 316 of the process 300 when the query is a command to store information about the location of an object. Queries for other commands, such as commands requesting information about the location of an object, may not cause new information to be stored about an object or its location. In instances where object location information is stored, additional information may also be stored in addition to the object identifier, location, and object attributes. For example, keywords or other attributes for locations may be identified using similar techniques to those used for object attributes (e.g., by determining the attributes of an entity corresponding to the location named in a command). Location attribute information can therefore be stored with an object-location entry. A timestamp that marks the date and time of when an object was left at a particular location or when a query was received can also be stored with an object-location entry. The timestamp can be used to perform sophisticated object-location lookup operations. For example, the timestamp can be used to respond to user queries that ask when an object was left at a location, for how long an object has been at a location, or where all the locations are that an object has been located at within a particular period of time.

In some implementations, information stored in the personal objects repository can be represented as a graph. The graph may comprise nodes (vertices) representing the various objects and locations stored in the repository, and edges that connect the nodes which represent relationships among the nodes. The graph may be represented in a similar manner as the graph shown depicted in FIG. 2. For example, a particular location, at which one or more objects are or have been located, may be represented by a node connected to other nodes for each of the one or more objects. Objects that have been located at one or more locations may have nodes that are respectively connected to other nodes for their respective locations. In some implementations, attributes for objects or locations can also be represented by nodes in the graph. For example, the object "To Kill a Mockingbird" may correspond to the book by Harper Lee, which may have been determined by accessing an entities data structure and matching the object to the book represented as an entity in the data structure. The author of the book, Harper Lee, may then be an attribute associated with the object and may be represented in the personal objects graph as a node connected to the "To Kill a Mockingbird" object node.

At stage 318, a second query is received. The second query may refer to an object that has previously been stored in the personal objects repository. For example, the first query received at stage 302 may have been an object-location storage command, and the second query may be a retrieval command that requests the process 300 to respond with the location of the object from the first query. The second query may use the same, similar, or even very different language from the first query to refer to the same object. For example, the first query may refer to a novel by its title (e.g., "To Kill a Mockingbird"), whereas the second query may refer to the novel by only a portion of its title (e.g., "Mockingbird"), or even by a completely different parameter such as by the author (e.g., "Harper Lee") or another attribute of the novel. Similarly a particular location specified in the query may be stated the same, similarly, or very differently from how the same location was specified in an earlier query. For example, one query may identify that an object is located at "Mom's place," whereas the second query identifies the same location as a street address for Mom's place, or at corresponding geographic coordinates for Mom's place.

At stage 320, the second query is parsed. The process 300 determines whether the query is a type of object-location command, and if so, which type of command (e.g., object-location storage command (assertion), completion command, retrieval command, trigger actions command). The various assertion, completion, retrieval, trigger action, and other grammars can be used to parse a spoken query, for example. The object and/or location string in the query is identified by parsing the query. For example, the query "Where did I leave the Harper Lee book?" can be parsed and determined to be a retrieval type command having object string "Harper Lee book" and no location specified.

At stage 322, the process 300 determines that an object and/or location specified in the second query is the same as an object and/or location specified in the first query that was previously received. If an identified object and/or location string from the second query matches a previously received object and/or location string from the first query, then the object and/or locations may be determined to be the same between the queries. If the same object or location is identified differently in the second query than how it was identified in the first query, then one or more of the closest matching objects or locations, respectively, can be identified. In some implementations, a string comparison is performed between portions of the second query and portions of the first query such as a comparison between the object string in the same query and the object string extracted from the first query. In some implementations, the object named in the second query indirectly references the same object named in the first query by one or more attributes of the object. For example, the "Harper Lee book" is an indirect reference to "To Kill a Mockingbird." If the second query includes the object string "Harper Lee book," then such string may be matched to "To Kill a Mockingbird" by comparing the object string "Harper Lee book" to the attributes for the book titled "To Kill a Mockingbird," and a match can be determined from the book's author. In some implementations, the attributes are keywords which have been tagged to the "To Kill a Mockingbird" object that was previously stored in the personal objects data structure, and a match is determined by performing a comparison of an indirect object specified in the second query to the keywords of previously stored objects. In this manner, the process 300 can identify one or more objects in a personal objects repository that likely correspond to an indirectly referenced object in a query. In some implementations, entries for objects or locations in a personal objects data structure can be updated when corresponding objects or locations are referenced in a series of queries, regardless of whether the references to the objects or locations are the same or different. For example, an entry for a location named "Bill's Apartment" can be created in the data structure in response to receiving a first query that indicates a first object is located at Bill's apartment. A second query may indicate that a second object is located at Bill's apartment, but may identify Bill's apartment by the street address 555 Candy Cane Lane, Apartment No. 3. The process 300 can determine that the address stated in the second query corresponds to Bill's apartment, and therefore, the location entry for Bill's apartment is updated to indicate that the second object is also located at Bill's apartment. For example, in the graph representation of the personal data structure a node of the second object can be branched off of the node representing the location for "Bill's apartment."

At stage 324, the process 300 performs an action associated with the object responsive to the second query. For example, identification information for an object and its current location can be saved for later retrieval; information about objects or locations can be retrieved and provided to a user; completion actions can be performed; and trigger actions can be performed in response to the second query.

Figure 4:
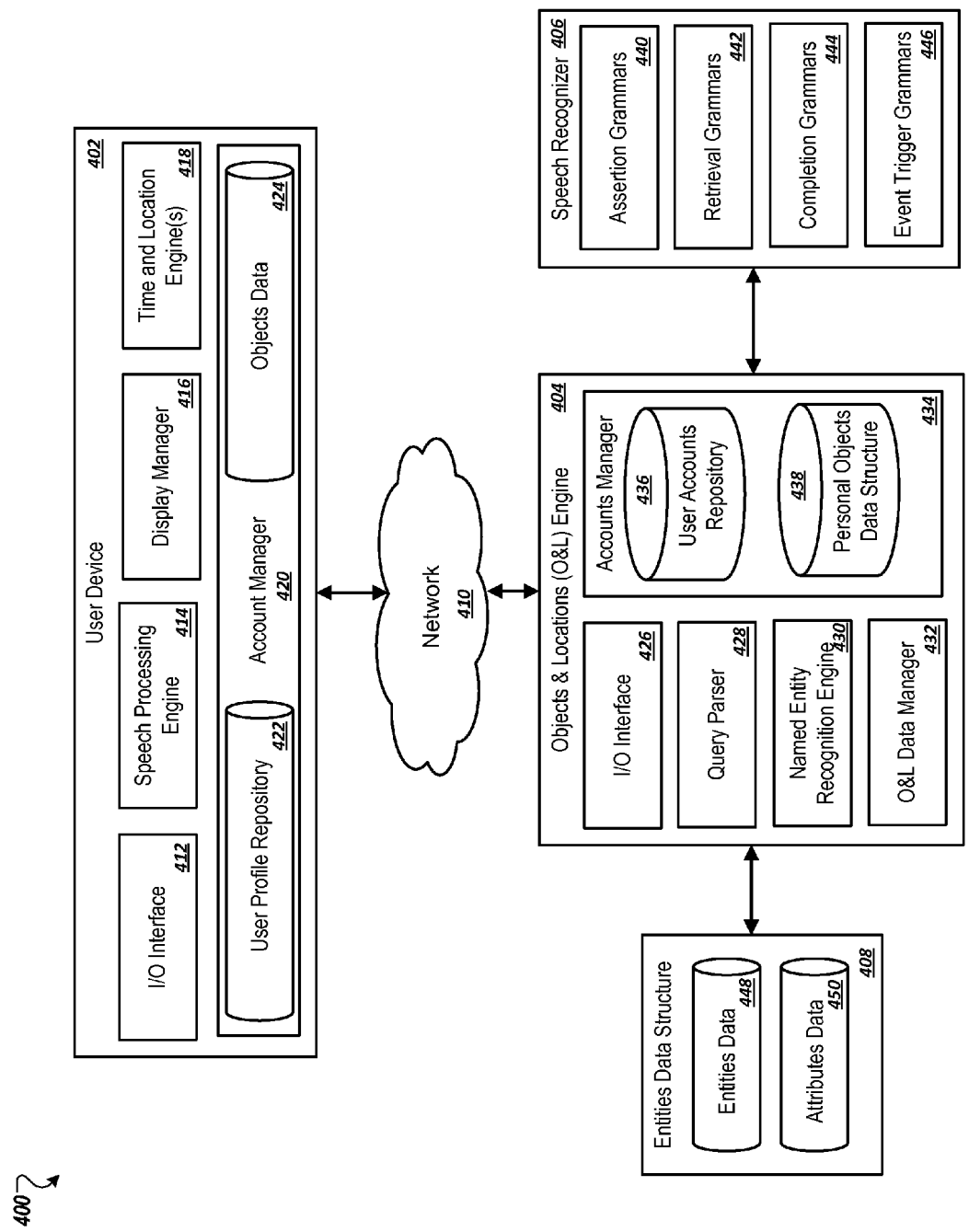
FIG. 4 shows an example of a system for managing and reporting information about the location of objects.

FIG. 4 depicts an example system 400 for managing and reporting location information for objects. The system 400 can be configured to receive user queries to store information about where a user has left personal objects so that the locations of such objects can later be recalled at the request of the user. The system 400 permits a flexible query structure and natural language to be used in queries to command the system 400 to store information about objects and locations of the objects, to perform operations on stored representations of the objects and their locations, and to respond to queries with information that is usable to present saved information about objects and locations to users. The system 400 can include one or more of a user device 402, a network 410, an objects and locations engine 404, an entities data structure 408, and a speech recognizer 406. Although various components of the system 400 are depicted as being separate from each other, in some implementations, particular ones of the components can be integrated with other components in various combinations, and some of the components may be separated into additional sub-components. For example, the speech recognizer 406 may be implemented on the user device 402 or on one or more server systems remote from the user device 402. Similarly, the objects and location engine 404 may be provided locally on the user device 402, on one or more server systems remote from the user device 402, or particular sub-components may be provided locally and others provided on remote servers. In some implementations, the system 400 can be configured to perform particular processes that are described in this paper, such as process 100 depicted in FIG. 1 or process 300 depicted in FIG. 3.

The user device 402 is configured to receive queries from a user and to present information to the user. The user device 402 may be a smartphone, tablet computing device, desktop computer, notebook computer, or smartwatch in some implementations. The user device 402 may be configured to receive queries based on spoken input from a user or based on textual input typed by the user. The user device 402 may also include or be operatively coupled to an electronic display, such as a touch-sensitive display, that can present information to a user. The user device 402 can include I/O interface 412, speech processing engine 414, display manager 416, time and location engines 418, and an account manager 420. The I/O interface 412 is configured to send and receive data from the user device 402. For example, the I/O interface 412 may include one or more wireless communication chips that can send and receive data over network 410, such as the internet or a private network. The speech processing engine 414 can perform speech recognition on spoken input from a user. In some implementations, the speech processing engine 414 may have a limited grammar that only recognizes a limited set of voice commands. The audio for spoken input of complex natural language queries can be transmitted, in some implementations, to the speech recognizer 406 for remote processing on servers having more sophisticated speech recognition capabilities and larger grammars than those on the user device 402. In some implementations, all speech processing is performed on the user device 402. The display manager 416 manages what is displayed on one or more electronic displays associated with the user device 402. Queries may be presented to the user as the query is received by the device 402, and query responses may be shown on the electronic display for presentation of the response to the user.

The time and location engines 418 are configured to track the current time and location of the user device 402. Using information from the time and location engines 418, the system 400 can associate user queries with a time and/or location. A timestamp can be associated with a query, for example, to indicate the date and time at which an object was left at a particular location. Thus, when the user makes an object-location storage command, such as "I lent the basketball to Paige this afternoon," the timestamp is associated with the command (query) in order to mark the date and time that the basketball was lent to Paige. In some implementations, a user can expressly specify when an object was left at a location, and such express timestamp supersedes a default, current timestamp from the time and location engines 418. For example, a query received on June 5 that stated, "I gave the basketball to Paige 4 days ago," can be tagged with the date June 1, rather than June 5, since the content of the query expressly indicates a date. By recording the date and time when an objects were left at particular locations, the system 400 can later use such information to respond to temporal-based queries regarding objects and locations. For example, the system 400 may use a timestamp associated with entries in a personal objects data structure to respond to queries about when an object was left at one or more locations, how long an object has been left at one or more locations, and where all the locations are that an object has been left at within a particular period of time.

The account manager 420 of the user device 402 manages one or more user accounts on the device 402. For example, the account manager 420 can manage respective accounts for each of multiple users. Each user account may include user profile information as well as information about user preferences related to object-location type commands. User account information can be stored in the user profile repository 422. One or more personal objects data structures for respective user accounts can be stored in an objects data repository 424. Therefore, different users can have their own, personal data structure separate from that of other others. When a first user is logged into the device 402 in a first account, the he may save and retrieve information about the locations of objects in his respective personal objects data structure. When another user is logged into the device 402 in a second account, that user may save and retrieve information about the locations of objects in his respective personal objects data structure. The accounts may be associated with the user device 402 (e.g., maintained by an operating system of the user device 402), or by one or more services or applications on or otherwise accessible to the device 402. For example, an objects-location application installed on the device may permit multiple different users to log into the application and may maintain respective accounts for each of the users. In some implementations, at least one of the user profile repository 422 and the objects data repository 424 can be maintained at least partially remotely from the user device 402, such as at an objects-locations server. In some implementations, user data, including the personal objects data structure, may be maintained both locally and remotely. Changes to the user data, such as updates to the personal objects data structure, can be automatically propagated between one or more local and remote devices when a change is made at one of the devices.

The objects and locations engine 404 ("O&L engine") is configured to receive, process, and respond to queries including one or more types of object-location commands. The O&L engine 404 can receive a query, parse the query, and respond based on the content of the query. For example, when a user issues a voice query at the user device 402, the user device 402 may send the query or a characterization of the query over network 410 to the O&L engine 404, which may be hosted on one or more remote servers. The O&L engine 404 can perform one or more actions in response to the query, such as storing information about where an object is located, identifying where an object is located, updating information about where an object is located, determining information for a trigger action, and generating instructions to send to the user device 402 to cause performance of an action in response to a trigger event.

The O&L engine 404 can include an I/O interface 426, a query parser 428, a named entity recognition engine 430, an O&L data manager 432, and an accounts manager 434. Moreover, the O&L engine 404 can communicate with a speech recognizer 406 and one or more external data sources such as an entities data structure 408. The I/O interface 426 is configured to communicate over one or more networks 410, such as a private network or the internet, and can communicate with the speech recognizer 406, the entities data structure 408 and other external sources, and with the user device 402.

The query parser 428 is configured to parse queries received from the user device 402. The query parser 428 can process a user query to determine whether it is an object-location command, and if so, the particular type of object-location command (e.g., object-location storage command, retrieval command, completion command, trigger actions command, or another type). The query parser can identify each object named a query, each location named in a query, and a correspondence between objects and locations named in a query. For example, a query may indicate that "The towels are in the dryer and the sheets are in the closet." The query parser 428 can identify that the query is an object-location storage command that includes references to two objects (towels and sheets), two locations (dryer and closet), and that the towels and dryer correspond as an object-location pair, and the sheets and closet correspond as another object-location pair.

In some implementations, the query parser 428 uses one or more grammars to process and parse a query. For example, a voice query may be transcribed by the speech recognizer 406. The speech recognizer 406 includes grammars that are configured to recognize various types of natural language object-location commands. The assertions grammar 440 is configured to permit recognition of object-location storage commands (e.g., "The hockey puck is in the backseat," "Remember that the art collection is at Bill's place."). The retrieval grammar 442 is configured to permit recognition of object retrieval commands (e.g., "Where is the hockey puck?", "What does Bill have?"). The completion grammar 444 is configured to permit recognition of objection completion commands (e.g., "I've returned the hockey puck," "Bill no longer has the art collection."). The event trigger grammars 446 are configured to permit recognition of event trigger commands ("Remind me that Sally wants the hockey puck," "Remind me that Sally wants the art collection after Bill."). The query parser 428 can send a query to be transcribed by the speech recognizer 406 with the various grammars 440-446 of the speech recognizer 406. From the transcription of the voice query, the query parser 428 can extract one or more character strings corresponding to objects and locations in the strings. In some implementations, the grammars 440-446 can be used to identify which terms in a textual query correspond to objects and locations, and also to determine the particular type of object-location command that a query is. For example, each grammar may be included in one or more language models that have been trained on a large number of training queries of a particular type. The assertion grammars 440 can be based on training samples of assertion-type queries (e.g., object-location storage commands), the retrieval grammars 442 can be based on training samples of retrieval-type queries, the completion grammars 444 can be based on training samples of completion-type queries, and event trigger grammars 446 can be based on training samples of event trigger-type queries. When a new query is received, a model that has been statistically trained on queries of the various types can make a probabilistic determination of the particular type of query that has been made (e.g., assertion, retrieval, completion, event trigger, other).

The named entity recognition engine 430 is configured to determine one or more attributes of an object or location named in a query. The named entity recognition engine 430 may determine attributes for either objects or locations in a query, or for both objects and locations. If more than one object or location is provided in a query, the engine 430 can determine attributes for all or only some of the objects or locations. The named entity recognition engine 430 can access one or more data sources to identify the attributes for an object or location. In some implementations, the data sources may be external to the system 400. For example, the named entity recognition engine 430 may perform a search of one or more corpora based on the query or based on the object or location of interest. The content of the search results can then be used to determine one or more keywords associated with the object or location. For instance, the named entity recognition engine 430 may identify keyword attributes for the object "camera" by the performing a search for the word camera, and determining the most relevant keywords associated with camera from one or more of the top-ranked search results. These keyword attributes can then be associated with the camera object so that the camera can later be identified based on its attributes (e.g., photograph, lens, viewfinder, D-SLR, etc.) rather than or in addition to the original manner in which the camera was identified in a query.

In some implementations, the named entity recognition engine 430 determines attributes for an object or location by identifying one or more entities that the object or location corresponds to in the real world, and associating attributes for those entities with the object or location named in the query. In one example, the entity and its attributes are identified with reference to an entities data structure 408. The entities data structure 408 generally includes a structured representation of entities (e.g., persons, places, things, ideas), relationships among entities, and attributes of such entities. The entities data structure 408 may be represented as a graph having nodes representing entities and edges connecting the nodes representing relationships among entities and various attributes (e.g., facts) about the entities. One example of such a graph is shown in FIGS. 2A and 2B. The entities data repository 448 includes data for the entities represented in the data structure 408, and the attributes data repository 450 includes data regarding the attributes of the entities. The entities data structure 448 may be procured manually, automatically, or a combination of both. For example, entities may be determined by crawling publicly available resources on the internet, analyzing the content of the publicly available resources, and making a determination about the existence and attributes of entities based on the analysis of the resources. For instance, the topic of a large number of resources may be a particular object (or series of objects), such as the Sherlock Holmes series of books by Arthur Conan Doyle. A high confidence may be determined that each book in the series is an entity, as is their author, Sir Arthur Conan Doyle. Moreover, various attributes may be determined for the books such as a genre (mystery), and the time and place that they were written and first published. Such information may be stored in the entities data structure 448.

In some implementations, the named entity recognition engine 430 may associate an object or location in a query with an entity in the entities data structure 448, such as by a pointer that references the associated entity. This way, if information is added or otherwise updated about an entity, such information can be updated for the corresponding object or location from the query as well.

The O&L data manager 432 manages information about objects and locations. For example, working with the accounts manager 434 and in response to user queries, the O&L data manager 432 can store and access information about objects and object storage locations for users. Once a query has been parsed and object or location attributes determined, the O&L data manager 432 can cause such information to be stored in a by the query parser 428 and named entity recognition engine 430, respectively, information regarding an object, its location, and attributes of the object and location can be stored in a personal objects data structure 438, which is maintained by the accounts manager 434. For example, as indicated by data in the user accounts repository 436, a respective personal objects data structure 438 can be maintained for each of multiple user accounts. Therefore, for example, Fred can save and retrieve information about where his own personal objects are located, and Emma can do the same. The O&L data manager 432 can also pull information from the personal objects data structure 438 to respond to queries, such as object retrieval queries, for example.

Figure 5:
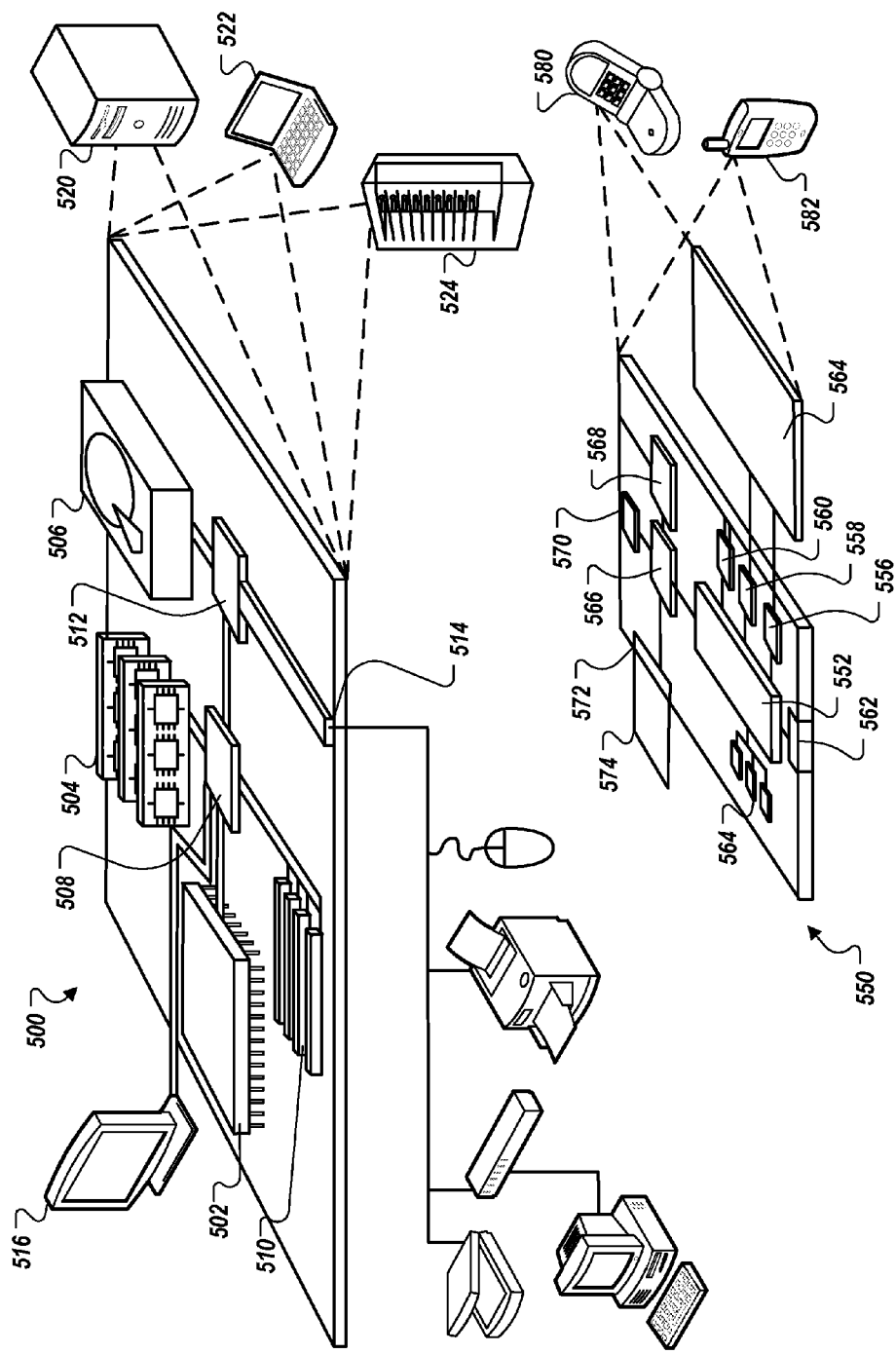
FIG. 5 shows an example of a computing device 500 and a mobile computing device that can be used to implement the techniques described herein.

FIG. 5 shows an example of a computing device 500 and a mobile computing device that can be used to implement the techniques described herein. The computing device 500 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smartphones, and other similar computing devices. The components shown here, their connections and relationships, and their functions, are meant to be examples only, and are not meant to limit implementations of the subject matter described and/or claimed in this document.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as a display 516 coupled to the high-speed interface 508. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 may also be another form of computer-readable medium, such as a magnetic or optical disk.

The storage device 506 is capable of providing mass storage for the computing device 500. In some implementations, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. The computer program product may also contain instructions that, when executed, perform one or more methods, such as those described above. The computer program product can also be tangibly embodied in a computer- or machine-readable medium, such as the memory 504, the storage device 506, or memory on the processor 502.

The high-speed interface 508 manages bandwidth-intensive operations for the computing device 500, while the low-speed interface 512 manages lower bandwidth-intensive operations. Such allocation of functions is by way of example only. In some implementations, the high-speed interface 508 is coupled to the memory 504, the display 516 (e.g., through a graphics processor or accelerator), and to the high-speed expansion ports 510, which may accept various expansion cards (not shown). In the implementation, the low-speed interface 512 is coupled to the storage device 506 and the low-speed expansion port 514. The low-speed expansion port 514, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device (not shown), such as a mobile computing device 550. Each of such devices may contain one or more of the computing device 500 and the mobile computing device 550, and an entire system may be made up of multiple computing devices communicating with each other.

The mobile computing device 550 includes a processor 552, a memory 564, an input/output device such as a display 554, a communication interface 566, and a transceiver 568, among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate.

The processor 552 can execute instructions within the mobile computing device 550, including instructions stored in the memory 564. The processor 552 may be implemented as a chipset of chips that include separate and multiple analog and digital processors. The processor 552 may provide, for example, for coordination of the other components of the mobile computing device 550, such as control of user interfaces, applications run by the mobile computing device 550, and wireless communication by the mobile computing device 550.

The processor 552 may communicate with a user through a control interface 558 and a display interface 556 coupled to the display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a SIMM (Single In Line Memory Module) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provide as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. The computer program product contains instructions that, when executed, perform one or more methods, such as those described above. The computer program product can be a computer- or machine-readable medium, such as the memory 564, the expansion memory 574, or memory on the processor 552. In some implementations, the computer program product can be received in a propagated signal, for example, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 568 using a radio-frequency. In addition, short-range communication may occur, such as using a Bluetooth, WiFi, or other such transceiver (not shown). In addition, a GPS (Global Positioning System) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.) and may also include sound generated by applications operating on the mobile computing device 550.

The mobile computing device 550 may be implemented in a number of different forms, as shown in the figure. For example, it may be implemented as a cellular telephone 580. It may also be implemented as part of a smart-phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although various implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method, comprising:
receiving, at a first time, a first query that includes one or more first terms that describe a physical object;
determining that the first query represents a command to store location information for the physical object;
parsing the first query to determine identifying information for the physical object, and determining, from the first query or a context of the first query, a location of the physical object;
generating a first node in a data structure, the first node representing the physical object;
linking the first node in the data structure to a second node in the data structure, the second node representing the location of the physical object;
identifying an attribute of the physical object by accessing data that identifies one or more facts or categories of the physical object, wherein the identified attribute is not specified in the first query;
associating the first node that represents the physical object with the identified attribute of the physical object;
receiving, from a user device at a second time that is after the first time, a second query that represents a command to retrieve the location of the physical object, the second query including one or more second terms that describe the identified attribute of the physical object;
in response to receiving the second query that represents the command to retrieve the location of the physical object, determining the location of the physical object based on (i) the identified attribute of the physical object being associated with the first node in the data structure that represents the physical object and (ii) the first node being linked to the second node in the data structure that represents the location of the physical object; and
providing, to the user device as a response to the second query, an indication of the location of the physical object,
wherein the user device is configured to display a representation of the location of the physical object in a graphical interface shown on an electronic display of the user device.

2. The computer-implemented method of claim 1, further comprising:
  determining that the physical object corresponds to one or more entities in the data structure of entities, wherein the data structure includes representations of a plurality of entities and maps relationships among particular ones of the plurality of entities;
  wherein identifying the attribute of the physical object that is not specified in the first query comprises selecting the one or more facts or categories based on the one or more facts or categories being associated with the one or more entities in the data structure to which the physical object is determined to correspond.

3. The computer-implemented method of claim 1, further comprising storing the data for the physical object in a personal objects data structure associated with a particular user account, wherein the personal objects data structure:
  (i) includes representations of one or more physical objects and one or more locations, and
  (ii) maps relationships among particular ones of the one or more physical objects and the one or more locations.

4. The computer-implemented method of claim 3, wherein the personal objects data structure maps the relationships so as to indicate at least a last known location for particular ones of the one or more physical objects.

5. The computer-implemented method of claim 3, further comprising receiving a third query that comprises a command to update information about the physical object, and wherein performing the command of the third query comprises updating the data stored for the physical object in the personal objects data structure.

6. The computer-implemented method of claim 5, wherein the command to update the information about the physical object comprises an indication that the physical object is located at a new location, and wherein updating the data stored for the physical object in the personal objects data structure comprises updating the stored location information for the physical object to specify the new location of the physical object.

7. The computer-implemented method of claim 1, wherein the first query further includes one or more third terms that identify the location of the physical object.

8. The computer-implemented method of claim 7, wherein the one or more third terms that identify the location of the physical object comprise one or more third terms that specify a geographical location of the physical object.

9. The computer-implemented method of claim 1, wherein the first query further includes one or more third terms that identify a person or an organization with whom the physical object has been left, and wherein the method further comprises:
  associating the person or the organization with whom the physical object has been left with a contact from an account of a user;
  detecting a user interaction with the contact that is associated with the person or the organization with whom the physical object has been left; and
  in response to detecting the user interaction with the contact, causing a notification to be presented to the user pertaining to the physical object.

10. The computer-implemented method of claim 1, further comprising determining that a user device is located within a threshold distance of the location of the physical object, and in response, causing the user device to display the representation of the location of the physical object in the graphical interface.

11. The computer-implemented method of claim 1, wherein the first query does not include information that identifies the location of the physical object in content of the first query, and wherein the location of the physical object is determined based on a current location of a computing device at which the first query was originally entered or spoken.

12. The computer-implemented method of claim 1, wherein the first query specifies that a user has left the physical object at the location of the physical object, a third received query specifies that the physical object has been returned to the user, and performing a command specified by the third received query comprises causing information to be stored that indicates that the physical object is no longer located at the location of the physical object identified in the first query.

13. The computer-implemented method of claim 1, further comprising, in response to determining that the physical object is no longer located at the location of the physical object, causing a notification to be presented to a user that includes a reminder about one or more events associated with the physical object.

14. The computer-implemented method of claim 1, further comprising: identifying one or more attributes of the location of the physical object that are not specified in the first query.

15. The computer-implemented method of claim 1, wherein the second query does not include any of the one or more first terms that described the physical object in the first query.

16. The computer-implemented method of claim 1, further comprising:
  receiving a third query that includes one or more third terms that describe a second physical object;
  determining that the third query represents a command to store location information for the second physical object;
  parsing the third query to determine identifying information for the second physical object;
  determining, from the third query or a context of the third query, a location of the second physical object;
  generating a third node in the data structure, the third node representing the second physical object; and
  linking the third node in the data structure to a fourth node in the data structure, the fourth node representing the location of the second physical object.

17. The computer-implemented method of claim 1, wherein the location of the physical object is a geographic location.

18. One or more computer-readable devices having instructions stored thereon that, when executed by one or more processors, cause performance of operations comprising:
  receiving, at a first time, a first query that includes one or more first terms that describe a physical object;
  determining that the first query represents a command to store location information for the physical object;
  parsing the first query to determine identifying information for the physical object, and determining, from the first query or a context of the first query, a location of the physical object;
  generating a first node in a data structure, the first node representing the physical object;
  linking the first node in the data structure to a second node in the data structure, the second node representing the location of the physical object;

identifying an attribute of the physical object by accessing data that identifies one or more facts or categories of the physical object, wherein the identified attribute is not specified in the first query;

associating the first node that represents the physical object with the identified attribute of the physical object;

receiving, from a user device at a second time that is after the first time, a second query that represents a command to retrieve the location of the physical object, the second query including one or more second terms that describe the identified attribute of the physical object;

in response to receiving the second query that represents the command to retrieve the location of the physical object, determining the location of the physical object based on (i) the identified attribute of the physical object being associated with the first node in the data structure that represents the physical object and (ii) the first node being linked to the second node in the data structure that represents the location of the physical object; and providing, to the user device as a response to the second query, an indication of the location of the physical object, wherein the user device is configured to display a representation of the location of the physical object in a graphical interface shown on an electronic display of the user device.

19. A computing system, comprising:

one or more processors; and one or more computer-readable devices having instructions stored thereon that, when executed by the one or more processors, cause performance of operations comprising:

receiving, at a first time, a first query that includes one or more first terms that describe a physical object;

determining that the first query represents a command to store location information for the physical object;

parsing the first query to determine identifying information for the physical object, and determining, from the first query or a context of the first query, a location of the physical object;

generating a first node in a data structure, the first node representing the physical object;

linking the first node in the data structure to a second node in the data structure, the second node representing the location of the physical object;

identifying an attribute of the physical object by accessing that identifies one or more facts or categories of the physical object, wherein the identified attribute that is not specified in the first query;

associating the first node that represents the physical object with the identified attribute of the physical object;

receiving, from a user device at a second time that is after the first time, a second query that represents a command to retrieve the location of the physical object, the second query including one or more second terms that describe the identified attribute of the physical object;

in response to receiving the second query that represents the command to retrieve the location of the physical object, determining the location of the physical object based on (i) the identified attribute of the physical object being associated with the first node in the data structure that represents the physical object and (ii) the first node being linked to the second node in the data structure that represents the location of the physical object; and providing, to the user device as a response to the second query, an indication of the location of the physical object, wherein the user device is configured to display a representation of the location of the physical object in a graphical interface shown on an electronic display of the user device.

* * * * *